Oct. 10, 1933.     H. J. ALDERSON     1,930,118
BEARING CONSTRUCTION
Filed Sept. 16, 1929
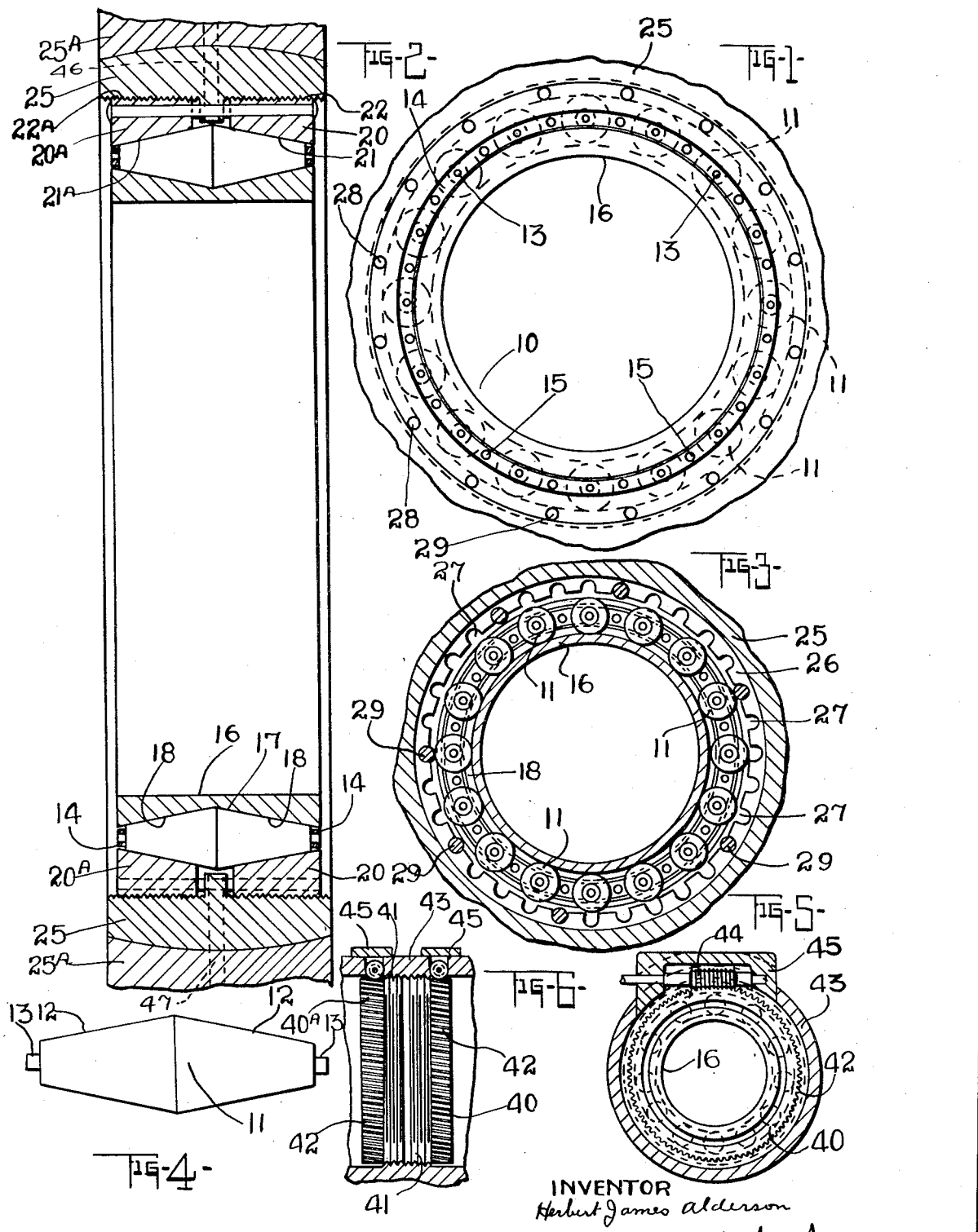
INVENTOR
Herbert James Alderson
BY  E. J. Fetherstonhaugh
ATTORNEY.

Patented Oct. 10, 1933

1,930,118

UNITED STATES PATENT OFFICE 1,930,118

BEARING CONSTRUCTION

Herbert James Alderson, Toronto, Ontario, Canada, assignor of one-half to James Legge, Lampton Park, Ontario, Canada Application September 16, 1929
Serial No. 393,040

6 Claims. (Cl. 308—212)

The invention relates to bearings, as described in the present specification and illustrated in the accompanying drawing which forms part of same.

The invention consists essentially of the novel features of construction pointed out broadly and specifically in the claims for novelty following a description containing an explanation in detail of an acceptable form of the invention.

The objects of the invention are particularly to facilitate the placing of crank shafts and thereby eliminate much of the trouble in the motor world incident to the construction and maintenance of such shafts in motor vehicles; to furnish in machinery a disc bearing adaptable to many purposes in which the necessity of the thrust bearings is largely eliminated, thus insuring even and smooth running of the many parts of the machine in which rotating parts of that type are utilized in the driving mechanism; to enable the mechanic in the assembling of the machine to adjust the bearings to a nicety from time to time and to lock the parts to the set position; and generally to provide in bearings for discs, shafts and other rotating parts, an efficient construction whereby true and free operation will be maintained for considerable periods.

In the drawing, Figure 1 is a side elevation of the assembled bearings showing the rollers in dotted lines.

Figure 2 is an enlarged cross sectional view showing the rollers in solid lines.

Figure 3 is a vertical side sectional view showing one of the race rings in solid lines.

Figure 4 is a detail of a roller.

Figure 5 is a reduced view showing a modified form of adjusting mechanism.

Figure 6 is a sectional detail of a modified form of adjusting mechanism.

Like numerals of reference indicate corresponding parts in the various figures.

Referring to the drawing, the numeral 10 indicates the rotating part and the numerals 11 and 12 indicate the double cones of the roller which taper from the centre outwardly and terminate at the ends in the pivot pins 13 which are journalled in the axially or longitudinally spaced roller retaining or roller spacing rings 14 of the roller retaining cage, these longitudinally or axially spaced roller retaining rings 14 being secured to each other by means of the fasteners or connecting rods 15 by means of which the retaining cage is completed.

The fixed or inner race ring 16 is recessed at 17 correspondingly for the double cone roller 11. The fixed or inner race ring 16 may be made integral with or it may be connected to a part or member with which it is associated.

The adjustable outer race rings 20 and 20A encircle the inner race ring 16 and have the bevelled surfaces 21 and 21A engaging the double cone surfaces of the rollers and are adjustable thereon, these rollers spacing the adjustable outer rings from the fixed or inner ring of the race.

The adjustable outer rings have longitudinally extending pin orifices 22 therethrough that parallel the longitudinal axis of the bearing, and these adjustable outer race rings are externally threaded and screw into the internal bearing frame 25 of the housing structure 25A. The internal bearing frame 25 is in fact an outer ring shaped frame or body member constituting part of a self-contained bearing of the anti-friction type and which self-contained bearing as a whole comprises the outer ring shaped internally threaded frame or body member 25, the outer adjustable race rings 20 and 20A, the cone rollers, the roller retaining cage, the inner race rings 16, and any other functioning part operatively associated therewith, as for example the holding pins 29 hereinafter referred to. When the parts of the self-contained bearing are adjusted the conical rollers are held against longitudinal movement by the tapering faces 18 of the inner race ring 16. This bearing frame member 25 has the central rib 26 which is notched or slotted at 27 for the pins 29 which are inserted through the pin orifices 22 and through the selected notches 27 and through a flanged ring as shown at 28.

Lubrication is provided by suitable oil inlets 46 and oil outlets 47 as shown in dotted lines in Figure 2.

In the adjustment of these roller bearings the adjustable rings of the race are screwed into the bearing frame until their bevel surfaces closely and evenly engage the tapered surfaces of the rollers. Then the pins are inserted and they engage the rib from the bearing frame, each in one of the notches and extend through a flanged ring which subsequently closes in the rings forming the race members.

For special forms of shafts and the like where difference in position may take place, the collar or ring shaped internally threaded body member 25 is suitably secured into the bearing frame or housing 25A and head to the adjustable rings by the pins 29. In this way any variation in the shaft will be taken up by the contour of the collar and which will keep the bearings in parallel position to the shaft.

The inner or fixed race ring which is secured to the shaft or other operating part which is to be journalled has its outer surface recessed so as to form a seat for the cone shaped rollers which are secured to the roller ring and the adjustable race rings also have bevelled or recessed surfaces to form a seat for the other side of the cone shaped rollers so that it will be seen that upon the rotation of the inner race ring the cone shaped rollers will immediately revolve through friction therewith and the roller ring consequently will rotate but naturally not at the same speed as the fixed ring which is being driven by a shaft or other member.

The stress on the cone shaped rollers will therefore be distributed throughout but naturally the main point of contact will be the apex portion of each of the rollers and any wear and tear through use to the rollers is taken up by the adjustable rings as hereinbefore described.

In Figures 5 and 6 the only difference is that the adjustment is done by a gear mechanism in which the gears 40 and 40A are part with the adjustable rings 41, and the teeth 42 of these gears mesh with the worms 44 which are suitably journalled in the frames 43 and slots having the closure plates 45.

It will be readily understood, the operation of this worm gear mechanism, as by rotating the worms are moved inwardly towards the cone surfaces of the roller. Of course this can only be done in a fairly large sized bearing as in the smaller bearings the construction as hereinbefore set forth is preferable.

It will be noted that the bearing construction which is the basis of the present invention is a self-contained construction and that it is of the anti-friction roller type. The invention is not necessarily limited to a true rolling anti-friction bearing but as indicated it is directed to that class of bearings which is broadly designated as of the roller anti-friction type.

What I claim is:

1. In a self-contained bearing construction, an outer ring shaped frame or body member having internal threaded portions, a roller retaining ring cage within said ring shaped body member, a plurality of rollers tapering outwardly from the center on each side and journalled in said roller retaining ring cage, a pair of adjustable outer race rings each of which is exteriorly provided with a screw threaded portion in engagement with a corresponding threaded portion of said outer ring shaped body member and internally provided with a suitable roller race way arranged in operative engagement with tapering portions of said rollers.

2. In a self-contained bearing construction, an outer ring shaped body member having a central inwardly extending lip and interiorly threaded portions on each side of the lip, a roller retaining cage, a plurality of rollers journalled in said retaining cage and each shaped so as to have tapering sides merging from the center toward a common axis and adjustable outer rings having exteriorly threaded portions engaging with the threaded portions of said outer ring shaped body member, which adjustable outer race rings have inner roller engaging surfaces serving as race ways for the tapering sides of the rollers, and removable means for locking said adjustable outer race rings to said inwardly extending lip.

3. In a self-contained bearing construction, an outer ring shaped body member having interiorly threaded portions, a roller retaining cage, a plurality of tapering rollers operatively associated with said cage, each roller being shaped so as to have tapering sides merging from the center toward a common axis and held in spaced relationship by the cage, a pair of outer adjustable race rings each of which is exteriorly threaded whereby a screw threaded connection is provided between the outer ring shaped frame or body member and the outer race ring, each of said outer race rings having an inner surface shaped so as to provide a roller race way, said outer race rings each being provided with a peripheral gear, and gear operating members carried in and by said outer ring shaped body member, there being a gear operating member for each outer race ring, and in operative engagement with the peripheral gear of the race ring corresponding thereto.

4. In a self-contained bearing construction, a ring shaped body or frame member which is interiorly threaded, a roller assemblage comprising a cage and rollers held in spaced relationship in respect to each other by said cage, each of which rollers is larger at the center and tapers outwardly, a pair of outer race rings, each of which is exteriorly threaded and has positioning engagement with the inner threaded section corresponding thereto of the outer frame member, the inner portion of said outer race rings being shaped so as to provide oppositely disposed roller race ways and arranged so that the race way of one outer race ring engages one end section of the rollers and so that the race way of the other outer race ring engages the other end section of the rollers, and an inner race ring providing oppositely disposed sloping portions that provide suitably adapted race ways for said rollers.

5. A bearing construction as defined in and by claim 4, according to which the outer ring shaped frame or body member is provided with an inwardly extending lip, according to which the outer race rings are provided with longitudinally extending pin receiving openings and according to which pins are provided whereby when placed in said longitudinally extending pin receiving openings they can be relied upon to lock the outer race rings in adjusted position due to engagement of said pins in slotted portions of said lip.

6. A bearing construction as defined in and by claim 4, according to which the outer frame member carries a pair of adjusting gears thereupon, one for each outer race ring, and accordingly to which each of the outer race rings is provided with a peripheral gear portion which engages the operating gear member corresponding thereto.

HERBERT JAMES ALDERSON.